FREQUENCY SUPPRESSION CIRCUIT

Filed April 4, 1955

INVENTOR.
JOHN R. SHERWOOD

BY Marvin Moody

ATTORNEY 2,866,941

FREQUENCY SUPPRESSION CIRCUIT

John R. Sherwood, Cedar Rapids, Iowa, assignor to Collins Radio Company, Cedar Rapids, Iowa, a corporation of Iowa Application April 4, 1955, Serial No. 499,012

13 Claims. (Cl. 332—44)

This invention relates generally to frequency suppression circuits and particularly to a circuit that suppresses a particular signal from a group of mixed signals.

The invention is concerned generally with a type of circuit commonly known as the balanced modulator circuit. Such a circuit receives a pair of input signals, mixes them, and suppresses at the circuit output components having the frequency of a selected input signal and its harmonics.

Balanced modulator circuits commonly use transformer inputs and outputs, and the transformers must have accurately balanced center-taps. The transformer type of balanced modulator does not operate properly at radio-frequencies because it has been found extraordinarily difficult, if not impossible, to maintain a high degree of transformer balance at radio-frequencies.

The invention provides a circuit which does not require any transformer component and is particularly adaptable for operation at radio-frequencies, although it is theoretically capable of operating at any frequency.

There are known circuits which perform the operation of balanced modulator circuits but do not have transformers; however, these circuits are operable only when the input signals have a fixed amplitude relationship.

The invention provides a circuit that will maintain its suppressing function over a very wide range of input amplitude variation and does not require any predetermined relationship among input signals to obtain suppression.

Also, the invention utilizes single-ended input signals and provides a single-ended output signal. The term "single-ended" means herein a circuit that uses ground as a return path and requires only a single lead to channel the signal. Ground, of course, has its ordinary meaning in the art and includes chassis connections or even a single return lead as well as actual earth ground.

It is therefore an object of this invention to provide a circuit which can mix a pair of signals having different frequencies and can provide a mixed output that substantially excludes at least one of the input frequencies. The signals may both be audio-frequency or radio-frequency, or one may be audio and the other radio-frequency.

It is another object of this invention to provide a suppression circuit which can mix an audio-frequency signal with a radio-frequency carrier and which provides an output that suppresses the carrier but provides sidebands that are linear with the input audio signal.

It is still another object of this invention to provide a frequency suppression circuit which does not have its suppression characteristic dependent upon variation in amplitude of its input signals.

It is a further object of this invention to provide a frequency suppression circuit that has high input impedances to thus utilize low power input sources.

It is a still further object of this invention to provide a frequency suppression circuit which receives single-ended input signals and which also provides a single-ended output signal.

The invention uses a pair of electron tubes and has the two input signals connected respectively to their control grids. An impedance means is connected between ground and the cathode of both tubes; and a tank circuit or transformer divider is connected at selected points, as will be explained below, to the plates of the electron tubes. In one form of the invention, the connection points to the tank circuit obtain an impedance relationship in the circuit with respect to the suppressed frequency to cause suppression. In another form of the invention, the gains at the suppressed frequency are controlled in portions of the circuit by a cathode potentiometer to cause suppression.

Further objects, features, and advantages of this invention will be apparent to a person skilled in the art upon further study of this specification and drawings in which.

Figure 1:
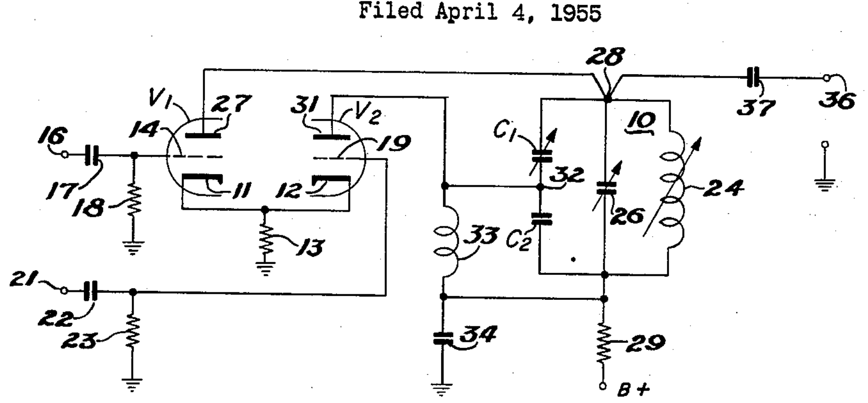
Figure 1 shows one form of the invention.

Now referring to the invention in more detail, Figure 1 shows a form of the invention which obtains the suppression requirement by adjustment of a capacitor relationship in an output tank circuit 10. A pair of electron tubes $V_1$ and $V_2$, which may be halves of a double triode tube, have their cathodes 11 and 12 connected together; and a cathode resistor 13 is connected between the cathodes and ground. The grid 14 of tube $V_1$ receives a first single-ended input signal from an input terminal 16 through an R-C coupling network comprising a capacitor 17 and a resistor 18. Similarly, the grid 19 of tube $V_2$ receives a second input signal from another input terminal 21 through another R-C network comprising a capacitor 22 and a resistor 23.

Tank circuit 10 includes an inductance 24, a trimmer capacitor 26, and a pair of capacitors $C_1$ and $C_2$ that are connected in series across inductance 24. Inductance 24 may be variable and might, for example, be controlled by a permeable slug that variably tunes the tank circuit. Capacitor $C_1$ is adjustable to control the ratio of: the impedance of capacitor $C_1$ to the impedance of capacitor $C_2$. However, capacitor $C_2$ or both capacitors might instead be varied to control the impedance ratio. Trimmer capacitor 26 is adjusted to compensate for capacitance changes in the tank circuit due to adjustment of the impedance ratio of capacitors $C_1$ and $C_2$ and also to provide an initial tuning adjustment for the circuit. Where such adjustments are not needed, trimmer capacitor 26 may be eliminated.

The plate 27 of tube $V_1$ connects at point 28 to one side of tank circuit 10; and the other side of tank circuit 10 connects to a B plus supply voltage through a decoupling resistor 29. The plate 31 of the other tube $V_2$ connects to the tank circuit at intermediate point 32 between capacitor $C_1$ and $C_2$. The B plus supply is provided to tube $V_2$ through a radio-frequency choke coil 33 and decoupling resistor 29. Also, a decoupling capacitor 34 connects between ground and decoupling resistor 29 to further decouple the signal circuit from the B plus source.

The single-ended output of the invention may be taken between ground and a terminal 36 which connects to point 28 on tank circuit 10 through a blocking capacitor 37.

The operation of the circuit in Figure 1 may be explained by assuming that input terminal 16 is connected to an audio signal source, and that the other input terminal 21 is connected to the output of a radio-frequency oscillator.

With respect to tube $V_2$, which receives the oscillator frequency on its grid 19, cathode resistor 13 acts degeneratively in cathode-follower fashion to provide a low impedance output that is received by cathode 11 of tube $V_1$, which thereby acts as a grounded-grid amplifier with respect to the oscillator signal.

Accordingly, an oscillator component output is provided at the plate of tube $V_1$ and is in-phase with the oscillator input to tube $V_2$ because tube $V_1$ acts as a grounded-cathode amplifier that provides a plate output that is in-phase with its cathode-follower input which is in-phase with the grid input signal of tube $V_2$.

On the other hand, the oscillator signal components provided at plate 31 of tube $V_2$ have opposite phase from the oscillator input on its grid 19, because tube $V_2$ acts as a grounded-cathode amplifier with respect to the oscillator signal. Although tube $V_2$ provides a cathode-follower type output to tube $V_1$, tube $V_2$ acts primarily as a grounded-cathode amplifier with respect to its plate output because tube $V_2$ has a plate impedance that is much greater than its cathode impedance.

Hence, the oscillator current components at the plates of tube $V_1$ and $V_2$ have opposite phase with respect to each other.

The oscillator input receives substantial gain in the plate circuit of tube $V_2$, due to grounded-cathode amplifier action. However, the plate gain of tube $V_1$, with respect to the oscillator components, is substantially less than the plate gain of tube $V_2$; because, firstly, tube $V_1$ receives a smaller oscillator input signal due to the cathode-follower type input coupling. Therefore, there is a substantial difference in the magnitudes of the oscillator components in the plate circuits of tubes $V_1$ and $V_2$.

The plates of tubes $V_1$ and $V_2$ are connected at different points 28 and 32 to tank circuit 10. The different points of connection provide different output impedances to the two tubes; and the output impedances are chosen in the invention to control the effective gains of the tubes with respect to oscillator frequency components. In effect, a good impedance match is provided to low-gain tube $V_1$, but a relatively poor impedance match is provided to high-gain tube $V_2$ so that the oscillator component outputs have equal effectiveness in tank circuit 10.

Thus, in Figure 1, the output impedances of tubes $V_1$ and $V_2$ are controlled by the impedance connections of their plates to tank circuit 10, which is tuned to resonate at the oscillator frequency. There, the plate load impedances have a ratio determined by the values of capacitors $C_1$ and $C_2$ and may be given by the equation:

$$\frac{Z_2}{Z_1}=\frac{C_1}{C_1+C_2} \qquad (1)$$

where $Z_1$ is the impedance provided to tube $V_1$ by its connection at point 28; and $Z_2$ is the impedance provided to tube $V_2$ by its connection at point 32.

The oscillator frequency outputs of tubes $V_1$ and $V_2$, as stated above, have opposite phase; and therefore they cancel in the tank circuit because of their adjustment to equal effectiveness. Consequently, an output signal taken from the tank circuit at terminal 36 will have absent from it components with the oscillator frequency.

It has been found in practice with a circuit of the type shown in Figure 1 that the oscillator frequency current component at the plate of tube $V_2$, designated herein as $i_{0_2}$, is about four times the oscillator frequency current component at the plate of tube $V_1$, designated herein as $i_{0_1}$. To provide the necessary impedance ratio, it was necessary to have equal values for capacitors $C_1$ and $C_2$ and to make one of them variable to obtain an exact adjustment. Thus, variable capacitor $C_1$ permits an exact adjustment of the impedance ratio to obtain an extremely high degree of suppression of the oscillator component in the output. It has been found relatively easy to obtain seventy decibels of carrier suppression at the output of a circuit of the type shown in Figure 1.

Although alignment of the circuit will be affected by variation in the transconductance of tubes $V_1$ and $V_2$, it has been found in practice that substitution of tubes still obtains suppression of oscillator components by more than twenty-five decibels without any readjustment of balancing condenser $C_1$.

The side-bands originate within the tubes due to non-linear current conduction characteristics of the tubes. The side-bands flow commonly through cathode resistor 13 in Figure 1 to excite the cathodes of both tubes in the same manner. Thus, the side bands will have the same phase at the plates of both tubes $V_1$ and $V_2$; and they will be additive in tank circuit 10, where they reinforce each other instead of cancelling as occurs with the oscillator frequency components.

The audio signal received upon grid 14 of tube $V_1$ will excite current components in the plate circuits of tubes $V_1$ and $V_2$ as explained above for the oscillator signal received on grid of tube $V_2$, although in a reversed manner. However, the frequency of the audio components is far removed from the resonant frequency of tank circuit 10; and therefore they are substantially attenuated by tank circuit 10. Accordingly, output terminal 36 essentially provides only the side-band modulation components free of both input signal components.

Figure 2:
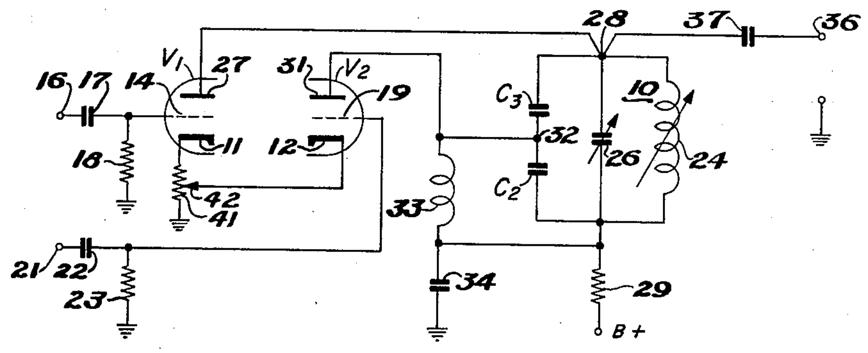
Figure 2 shows another form of the invention.
Figure 3:
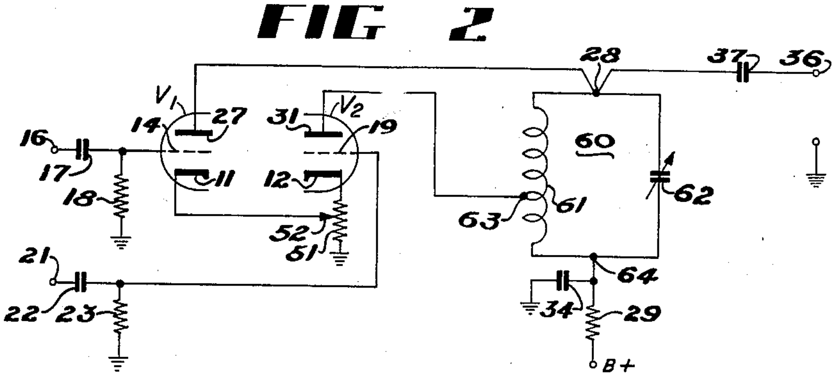
Figure 3 shows still another form of the invention.

Figures 2 and 3 show other forms of the invention which function in substantially the same manner as the form shown in Figure 1. However, they obtain suppression of the required frequency by adjusting the relative gains of the tubes rather than the relative output impedances.

In Figure 2, tubes $V_1$ and $V_2$ are the same as in Figure 1 and have their grids 14 and 19 connected respectively to input terminals 16 and 21 in the same manner. However, a potentiometer 41 is connected between ground and cathode 11 of tube $V_1$, while the tap 42 of potentiometer 41 is connected to cathode 12 of tube $V_2$. The remaining portions of the circuit in Figure 2 are connected exactly as is done in Figure 1 and components are identified by the same reference numerals except that variable capacitor $C_1$ is replaced by fixed capacitor $C_3$.

In Figure 3, tubes $V_1$ and $V_2$ are also connected to input terminals 16 and 21 in the same manner as shown in Figures 1 and 2. However, in Figure 3, another potentiometer 51 is connected between ground and cathode 12 of tube $V_2$ (rather than tube $V_1$ as is done in Figure 2); while its tap 52 connects to cathode 11 of tube $V_1$. A tank circuit 60 is provided which has an inductance coil 61 and a capacitor 62 which may be variable to tune the tank circuit. The plate of tube $V_1$ is connected to tank circuit 60 at point 28; while the plate of tube $V_2$ is connected to the tap point 63 on inductance 61. The B plus supply is connected at point 64 to tank circuit 60 through a decoupling resistor 29, and a decoupling capacitor 34 is connected between ground and point 64.

Tank circuit 60 in Figure 3 differs from the tank circuit in Figures 1 and 2 in that an inductance divider is used rather than a capacitance divider to connect the plates of tubes $V_1$ and $V_2$ to the tank circuit. A proper plate impedance ratio is obtained by suitably selecting connection point 63. Tank circuit 60 might be used instead of tank circuit 10 in Figures 1 and 2; but in Figure 1 tap point 63 would be adjustable to provide a final suppression adjustment.

Furthermore, the form of the tank circuit shown in Figure 3 permits capacitor tuning, while the form of the tank circuit shown in Figures 1 and 2 is best used for inductance tuning.

In Figure 2, fixed capacitors $C_1$ and $C_2$ are preferably chosen with values that approximate the required impedance ratio given in Formula 1; and a final adjustment is made by varying tap 42 of potentiometer 41.

Similarly in Figure 3, the connections to inductance 61 are fixed preferably to approximate a required coupling impedance ratio; and a final adjustment is made by varying tap 52 of potentiometer 51.

The conditions for suppression of the required frequency are basically the same in regard to Figures 2 and 3 as described above for Figure 1, where oscillator frequency components from tubes $V_1$ and $V_2$ energize the tank circuit in equal and opposite manners to obtain their cancellation.

In Figure 1, adjustment was made by varying capacitor $C_1$ to obtain the required plate output impedance ratio. But in Figures 2 and 3, the conditions for cancellation are obtained by varying the oscillator frequency component current outputs of tubes $V_1$ and $V_2$. This is done by controlling the relative gains of the oscillator frequency component currents by varying the common cathode coupling provided by a potentiometer.

In order to provide equal power to the tank circuit by oppositely phased oscillator components to obtain their suppression, the following equation must be satisfied:

$$\left(\frac{i_{0_1}}{i_{0_2}}\right)^2=\frac{R_2}{R_1} \quad (2)$$

where $R_1$ is the tank circuit resistance presented to component current $i_{0_1}$ and $R_2$ is the tank circuit resistance presented to component current $i_{0_2}$. The ratio of $R_1$ to $R_2$ is determined by the selection of connection point 63 or, if tank circuit 10 is used instead of tank circuit 60, by the relative values of capacitors $C_1$ and $C_2$, according to Equation 1.

In Figure 2, variation in relative gains is obtained by varying tap 42. To explain its operation, let it again be assumed that a radio-frequency oscillator input is provided to the grid of tube $V_2$ and that an audio signal input signal is provided to the grid of tube $V_1$, as described above for Figure 1. Then in regard to oscillator frequency components, tube $V_2$ couples to tube $V_1$ in a cathode-follower manner, and tube $V_1$ acts as a grounded-grid amplifier. Variation of the setting of tap 42 affects both the cathode-follower output impedance of tube $V_2$ and the coupling between the tubes, since only the common portion of the potentiometer between ground and the tap provides resistance for the cathode-follower action of tube $V_2$ and also provides the coupling impedance to tube $V_1$. Both the coupling and the cathode-follower action becomes smaller as tap 42 is moved toward the grounded end of the potentiometer; and also the gain of tube $V_1$, with respect to oscillator frequency components, decreases and becomes zero when tap 42 is grounded. However, the plate circuit gain of tube $V_2$ with respect to oscillator frequency components does not decrease with a lower tap setting but may increase somewhat because cathode degeneration becomes less and the negative grid bias becomes less.

Therefore, the ratio of oscillator frequency current components in the plate circuits of tubes $V_1$ and $V_2$ varies with the setting of tap 42; and by proper adjustment, the balancing situation given in Equation 2 can be obtained. Where only fine adjustment is desired with the potentiometer, a fixed cathode resistor may be serially connected with the potentiometer.

The connection of the potentiometer in Figure 3 is reversed from the connection shown in Figure 2. This provides a somewhat different adjustment characteristic than is obtained with the potentiometer connections in Figure 2. Hence, where the oscillator is connected to the grid of tube $V_2$, it will be noted that the cathode-follower action in Figure 3 remains substantially constant but that the coupling to tube $V_1$ is varied by the position of tap 52. As the tap position is moved toward the grounded end of the potentiometer, coupling decreases and becomes zero when tap 52 is grounded.

Thus, the gain of the tube $V_1$, with respect to oscillator frequency components, decreases to zero as tap 52 is moved toward ground. However, the negative grid bias of tube $V_1$ is also decreased as tap 52 is moved toward ground, which tends to increase the gain; but the decrease in coupling outweighs the effect of decrease in bias and maintains a net decrease in the gain of tube $V_1$, although a different gain variation characteristic is provided from that obtained in Figure 2. Thus, the conditions of Equation 2 can be satisfied by proper adjustment of the potentiometer to suppress the oscillator frequency at the output of the circuit.

Another way, somewhat different from that shown in Figures 1, 2, or 3, to align the circuitry of the invention for suppression of a given frequency component is to provide separate decoupling resistors in the plate supply circuits of tubes $V_1$ and $V_2$ and to make at least one decoupling resistor variable. Since the gain of a tube is a function of its plate voltage, the relative gains of the tubes can be adjusted to the alignment condition described above by adjusting a respective decoupling resistor to vary the plate voltage of its tube. Thus, a variable decoupling resistor may replace the alignment means given in Figures 1, 2, and 3.

In some applications of the invention, such as where it is used to suppress a radio-frequency carrier in communication circuits, linearity must be maintained between the modulating input and the side-band output. This is easily obtained in the invention by maintaining the modulation input less than about one-tenth of the carrier oscillator input. However, no precise input amplitude ratio is required, and either signal may fluctuate in magnitude below this ratio without affecting either linearity or suppression.

In applications of the invention where linearity between input and output components is not required, such as found in some filtering schemes, there is no restriction whatsoever upon the magnitudes of the input signals; and they might, for example, have equal magnitudes.

In the example given above, a change in magnitude of the oscillator input will vary the component currents in both plate circuits but will not affect their ratio. Thus, suppression is maintained regardless of oscillator input variation. And variation of the audio input also has no effect upon carrier suppression because it only varies the side-band components and does not affect the oscillator component ratio.

The output tank circuit in Figures 1, 2, and 3 need not be tuned to the frequency of the suppressed component. The frequency suppression characteristic of the invention is not affected by tuning but is a function of the divider properties of the output circuit. Hence, an untuned output circuit may be used which has the required divider characteristic, as, for example, may be obtained by removing capacitor 62 in Figure 3.

In many cases, it may be desirable to tune the tank circuit to a particular sum or difference frequency that is obtained by the mixing process. For example, where a frequency of ten megacycles is mixed with a frequency of one megacycle, the invention can select the sum frequency of eleven megacycles and reject the difference frequency of nine megacycles by tuning the tank circuit to eleven megacycles. In the same manner, the difference frequency of nine megacycles can be selected and the sum frequency of eleven megacycles can be rejected by tuning the tank circuit to nine megacycles.

It is therefore apparent that this invention provides a circuit which can mix a pair of signals having different frequencies to provide a mixed output that substantially excludes at least one of the frequencies. The invention is particularly adapted to the situation where at least one of the signals is radio-frequency, such as might occur in certain types of carrier-suppression apparatus. It is further apparent that the invention provides a circuit which can suppress a given frequency (such as an oscillator frequency), while maintaining linearity between another input signal (modulating signal) and certain output signals (side-band outputs). The invention also utilizes single-ended input circuit connections and provides a single-ended output connection. Unlike transformer-type balanced modulators, the invention has very high input impedances and thus may utilize low power oscillator and signal sources.

Many changes including widely differing embodiments can be made in the above construction of this invention by a man skilled in the art without departing from the scope of the invention. It is therefore intended that all the matter contained in the above description and shown in the accompanying drawings should be interpreted in an illustrating sense and not in a limiting sense.

What is claimed is:

1. A frequency suppression circuit that suppresses one of two mixed signals comprising, first and second electron tubes each having at least one grid, one of the signals received upon the grid of one tube, and the other of the signals received upon the grid of the other tube, a resistor connected to ground at one end and connected at the other end to the cathodes of the first and second tubes, a B plus source operably connected to the tubes, a tank circuit having at least a pair of serially connected capacitors, the plate circuit of the first tube connected serially with the pair of the capacitors to provide a first impedance connection to the tank circuit, the plate circuit of the second tube connected serially with only one of the capacitors to provide a second impedance connection to the tank circuit, the capacitors having an impedance ratio equal to the ratio of the gains of the two tubes with respect to the one signal that is to be suppressed.

2. A frequency suppression circuit that suppresses one of two mixed signals, comprising a pair of electron tubes each having at least one grid, one of the two signals received on the grid of one of the tubes, and the other of the two signals received on the grid of the other of the tubes, a potentiometer with opposite ends connected to ground and to the cathode of the one tube, the tap of the potentiometer connected to the cathode of the other tube, a B plus source operably connected to the tubes, a tank circuit including a pair of serially connected capacitors that have a predetermined ratio of capacitance, the plate of the one tube connected serially with both capacitors to provide a first impedance connection to the tank circuit, the plate of the other tube connected serially with only one of the capacitors to provide a second impedance connection to the tank circuit, and the tap on the potentiometer adjusted to suppress one of the input signals in the tank circuit.

3. A circuit for mixing a pair of input signals and suppressing one of the signals at the circuit output, the circuit comprising a first electron tube having at least one grid and receiving one of the input signals on the grid, a second electron tube having at least one grid and receiving the other of the input signals on the grid, a cathode resistor connected at one end to ground and connected jointly at the other end to the cathodes of the first and second tubes, a B plus supply operably connected to the tubes, a tank circuit including an inductance and a pair of series connected capacitors, a radio-frequency ground connected to one end of the inductance, the plate of the first tube connected to the other end of the inductance, an intermediate point between the capacitors connected to the plate of the second tube, a determinable ratio of output impedances provided to the first and second tubes by their connections to the tank circuit, whereby cancellation of a selected frequency component occurs in the tank circuit.

4. A frequency suppression circuit for suppressing one of a pair of mixed input signals comprising first and second electron control means, each control means having at least three electrodes, one control electrode of the first electron means receiving one of said input signals, and one control electrode of the second electron means receiving the other of said input signals, a tuned load means for said electron means, two points of different impedance values other than zero provided on the tuned load means, the output of the first electron means connected to the point of higher impedance, the output of the second electron means connected to the point of lower impedance, and a common impedance means connected serially to the remaining electrode of each electron control means, whereby only output current components having the frequency of the input signals oppose each other in the load means.

5. A circuit for canceling one of a pair of mixed input signals and comprising, a pair of electron tubes each having at least one grid, one input signal connected to the grid of one tube, and the other input signal connected to the grid of the other tube, a potentiometer connected between ground and the cathode of one of the tubes, the tap of the potentiometer connected to the cathode of the other tube, a tank circuit including an inductance and a pair of capacitors connected in series across the inductance, one end of the inductance connected to the plate of the one electron tube, the other end of the inductance connected alternating-current-wise to ground, an intermediate point between the capacitors connected to the plate of the other electron tube, a trimmer capacitor connected across the inductance, and a B plus source operably connected to the tubes, whereby the tap on the potentiometer is adjusted so that one of the input frequencies is canceled in the tank circuit.

6. A frequency suppression circuit comprising a pair of electron tubes, each of the tubes having at least one grid, impedance means connected between ground and the cathodes of said tubes, inductance means connected at one end to the plate of one of the tubes, an intermediate point on the inductance means connected to the plate of the other tube, a B plus supply voltage source connected to the other end of the inductance means, and a pair of input signals connected respectively to the grids of the tubes, whereby the input signal components oppose each other in the inductance means.

7. A frequency suppression circuit comprising, a pair of electron tubes each having at least one grid, impedance means connected between ground and the cathodes of the tubes, tuned output impedance divider means, one point on the divider means connected to the plate of one tube, another point on the divider means connected to the plate of the other tube, said tuned means being energized oppositely by said electron tubes at the suppressed frequency, a unidirectional voltage supply source operably connected to the tubes, and a pair of input signals connected to the grids of the respective tubes, whereby a particular frequency may be suppressed in the divider means.

8. A frequency suppression circuit comprising a pair of electron tubes each having at least one grid, a tank circuit including an inductance and a variable capacitor connected in parallel, one point on the inductance connected to the plate of one of the pair of tubes, another point on the inductance connected to the plate of the other of the pair of tubes, a potentiometer connected between ground and the cathode of the one tube, the tap of the potentiometer connected to the cathode of the other tube, a pair of input signals connected respectively to the grids of the tubes, and the potentiometer tap adjusted, whereby suppression of one of the input signals occurs in the tank circuit.

9. A frequency suppression circuit for suppressing one of two input signals of different frequencies that are to be mixed comprising, first and second electron-control means, each having at least two control electrodes and an output electrode, one control electrode of the first electron-control means receiving one of said input signals, one control electrode of the second electron-control means receiving the other of said input signals, common-impedance means connected to the other control electrode of each of said electron-control means to apply said one signal with respectively opposite phases at said output electrodes, a tuned load means having first and second terminals that provide different impedance values, the output electrodes of each of said electron-control means being connected respectively to said terminals, an output circuit coupled to said tuned load means, and the ratio of the impedance values at said terminals being inversely proportional to the square of the ratio of the amplitudes of said one signal respectively received at said terminals, whereby the frequency of said one signal is substantially suppressed in said output circuit.

10. A frequency suppression circuit as defined in claim 9 in which said common-impedance means comprises a resistance device coupled to said other control electrodes, said tuned load means including a capacitor divider, with said first and second terminals being connected to different points on said capacitor divider.

11. A frequency suppression circuit as defined in claim 10 in which said first and second electron-control means comprise first and second electron tubes, each having at least one control grid, cathode and plate, said resistance device connected between ground and the cathodes of said tubes, and said input signals respectively receivable at the grids of said tubes.

12. A frequency suppression circuit as defined in claim 10 in which said first and second electron-control means comprise first and second vacuum tubes, each having at least a control grid, cathode and plate, said resistance device connected between ground and the cathode of one of said tubes, with the cathode of the other tube connected to a tap point on said resistance device, and said input signals respectively receivable at the grids of said tubes.

13. A frequency suppression circuit as defined in claim 9 in which said first and second electron-control means comprise first and second vacuum tubes, each having at least a control grid, cathode and plate, said common-impedance means comprising a resistance device connected between ground and the cathode of one of said tubes, with the cathode of the other tube connected to a tap point on said resistance device, said tuned load means including an inductor divider, with said first and second terminals being provided at different points on said inductor divider, and said input signals respectively receivable at the control grids of said tubes.

References Cited in the file of this patent

UNITED STATES PATENTS

| | | |
|---|---|---|
| 2,248,083 | Hofer | July 8, 1941 |
| 2,432,720 | Brown | Dec. 16, 1947 |
| 2,485,665 | Shepherd | Oct. 25, 1949 |
| 2,490,448 | Lott | Dec. 6, 1949 |